(12) United States Patent
Goldberg et al.

(10) Patent No.: US 9,545,827 B2
(45) Date of Patent: Jan. 17, 2017

(54) WHEEL SUSPENSION FOR A REAR WHEEL OF A TWO-TRACK MOTOR VEHICLE

(71) Applicant: Audi AG, Ingolstadt (DE)

(72) Inventors: Ruben Goldberg, Ingolstadt (DE); Hans-Jürgen Langhoff, Lenting (DE); Dominik Mohrlock, Buxheim (DE); Marco Isliker, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/768,040

(22) PCT Filed: Jan. 18, 2014

(86) PCT No.: PCT/EP2014/000134
§ 371 (c)(1),
(2) Date: Aug. 14, 2015

(87) PCT Pub. No.: WO2014/124724
PCT Pub. Date: Aug. 21, 2014

(65) Prior Publication Data
US 2015/0375589 A1 Dec. 31, 2015

(30) Foreign Application Priority Data
Feb. 16, 2013 (DE) .................. 10 2013 002 705

(51) Int. Cl.
*B60G 3/20* (2006.01)
*B60G 3/24* (2006.01)
(Continued)

(52) U.S. Cl.
CPC . *B60G 3/20* (2013.01); *B60G 3/24* (2013.01); *B60G 7/001* (2013.01); *B60G 7/008* (2013.01);
(Continued)

(58) Field of Classification Search
CPC ............. B60G 3/20; B60G 3/24; B60G 7/001; B60G 7/008; B60G 7/02
See application file for complete search history.

(56) References Cited

U.S. PATENT DOCUMENTS

| | | | |
|---|---|---|---|
| 4,444,415 A | 4/1984 | von der Ohe | |
| 4,930,804 A * | 6/1990 | Tattermusch | ............ B60G 3/20 280/124.138 |

(Continued)

FOREIGN PATENT DOCUMENTS

| | | |
|---|---|---|
| CN | 2776728 | 5/2006 |
| CN | 101001764 | 7/2007 |

(Continued)

OTHER PUBLICATIONS

International Search Report issued by the European Patent Office in International Application PCT/EP2014/000134.

(Continued)

*Primary Examiner* — Faye M Fleming
(74) *Attorney, Agent, or Firm* — Henry M. Feiereisen LLC

(57) ABSTRACT

A wheel suspension for a rear wheel of a two-track motor vehicle, includes a five-link assembly which has five individual links which are coupled to the vehicle body via body-side bearings and to the wheel carrier of the rear wheel via wheel-carrier-side bearings, which five-link assembly, as viewed in the direction of travel, has a front pair of links and a rear pair of links, wherein the front pair of links has a lower, front link, with respect to the axis of rotation of the wheel, and an upper, front link, and the rear pair of links has a lower, rear link, in particular track rod, and an upper, rear link. A lower spring link, on which a spring arrangement having a vibration damper and a supporting spring is supported, is arranged in the direction of travel between the front and rear pairs of links. The front pair of links with (Continued)

respect to the spring link is of softer design in the transverse direction of the vehicle than the rear pair of links. As a result, a change in the toe-in at the rear wheel takes place under exertion of a lateral force or a longitudinal force.

14 Claims, 5 Drawing Sheets

(51) Int. Cl.
B60G 7/00 (2006.01)
B60G 7/02 (2006.01)
B60G 21/055 (2006.01)

(52) U.S. Cl.
CPC ............ *B60G 7/02* (2013.01); *B60G 21/0551* (2013.01); *B60G 2200/184* (2013.01); *B60G 2200/422* (2013.01); *B60G 2200/445* (2013.01); *B60G 2200/46* (2013.01); *B60G 2200/462* (2013.01); *B60G 2202/135* (2013.01); *B60G 2204/129* (2013.01); *B60G 2204/1224* (2013.01); *B60G 2204/1244* (2013.01); *B60G 2204/143* (2013.01); *B60G 2204/148* (2013.01)

(56) References Cited

U.S. PATENT DOCUMENTS

| | | | |
|---|---|---|---|
| 7,048,286 B2* | 5/2006 | Eppelein | B60G 3/20 280/124.106 |
| 7,891,684 B1 | 2/2011 | Luttinen et al. | |
| 7,963,538 B2* | 6/2011 | Roland | B60G 3/26 280/124.138 |
| 8,646,787 B2 | 2/2014 | Langhoff | |
| 8,925,945 B2 | 1/2015 | Mohrlock et al. | |
| 8,967,670 B2 | 3/2015 | Mohrlock et al. | |
| 9,096,273 B2 | 8/2015 | Mohrlock | |
| 9,108,482 B2 | 8/2015 | Mohrlock et al. | |
| 2004/0140641 A1 | 7/2004 | Eppelein | |
| 2005/0275183 A1* | 12/2005 | Amano | B60G 3/20 280/124.128 |
| 2010/0133775 A1* | 6/2010 | Roland | B60G 3/26 280/124.179 |
| 2015/0165862 A1 | 6/2015 | Schindler et al. | |
| 2015/0191071 A1 | 7/2015 | Schindler et al. | |
| 2015/0224841 A1 | 8/2015 | Goldberg et al. | |
| 2015/0375590 A1* | 12/2015 | Mohrlock | B60G 3/20 280/5.5 |

FOREIGN PATENT DOCUMENTS

| | | |
|---|---|---|
| CN | 101186175 | 5/2008 |
| DE | 35 09 145 A1 | 9/1986 |
| DE | 38 26 930 A1 | 3/1989 |
| DE | 44 08 571 A1 | 9/1994 |
| DE | 100 05 407 A1 | 9/2000 |
| DE | 100 05 472 A1 | 8/2001 |
| DE | 100 14 878 A1 | 9/2001 |
| DE | 101 33 424 A1 | 1/2003 |
| DE | 10 2010 050 749 A1 | 6/2011 |
| DE | 10 2010 030 292 A1 | 12/2011 |
| EP | 1 197 358 A1 | 4/2002 |
| EP | 1 364 816 A2 | 11/2003 |
| EP | 1 741 577 A1 | 1/2007 |
| EP | 2 423 009 A1 | 2/2012 |
| JP | 2005-112258 | 4/2005 |
| JP | 2006-35874 | 2/2006 |
| JP | 2008-168891 | 7/2008 |
| JP | 2009-29257 | 2/2009 |
| WO | WO 2012/164373 A1 | 12/2012 |

OTHER PUBLICATIONS

Chinese Search Report issued on Jul. 20, 2016 with respect to counterpart Chinese patent application 201480008595.3.

Translation of Chinese Search Report issued on Jul. 20, 2016 with respect to counterpart Chinese patent application 201480008595.3.

* cited by examiner

WHEEL SUSPENSION FOR A REAR WHEEL OF A TWO-TRACK MOTOR VEHICLE

CROSS-REFERENCES TO RELATED APPLICATIONS

This application is the U.S. National Stage of International Application No. PCT/EP2014/000134, filed Jan. 18, 2014, which designated the United States and has been published as International Publication No. WO 2014/124724 and which claims the priority of German Patent Application, Serial No. 10 2013 002 705.5, filed Feb. 16, 2013, pursuant to 35 U.S.C. 119(a)-(d).

BACKGROUND OF THE INVENTION

The invention relates to a wheel suspension for a steered or non-steered rear wheel of a two-track motor vehicle according to the preamble of patent claim 1.

From DE 10 2010 030 292 A1, a generic wheel suspension for a rear wheel of a two-track motor vehicle is known. The wheel suspension includes a five-link assembly, having five individual links. The individual links are hinged to the vehicle body by bearings situated on the vehicle body and to the wheel carrier of the rear wheel via bearings situated on the wheel-carrier. In the direction of travel, the five-link assembly includes a front pair of links and a rear pair of links. The front pair of links includes a lower front link and an upper front link with regard to the rear wheel axis of rotation. The rear pair of links includes a lower rear link and an upper rear link. A suspension arm is arranged in a lower link level in longitudinal direction of the vehicle between the two pairs of links. Furthermore, a spring arm is directly hinged to the wheel carrier of the rear wheel.

It is an object of the invention to provide a wheel suspension for a rear wheel of a two-track motor vehicle, in which an advantageous wheel toe and camber behavior is achieved as a result of lateral forces and longitudinal forces acting on the rear wheels.

SUMMARY OF THE INVENTION

The object is achieved by the features of the independent patent claim. Advantageous embodiments of the invention are disclosed in the subclaims.

According to the independent patent claim, a lower spring link is arranged in longitudinal direction of the vehicle between the front pair of links and the rear pair of links, on which lower spring link a spring arrangement is supported which includes a vibration damper and a suspension spring. The front pair of links, in terms of arrangement relative to the spring link, is designed softer in transverse direction of the vehicle than the rear pair of links. As a result of the fact that front pair of links is softer in transverse direction than the rear pair of links, an elastokinematic advantageous toe-in change can be achieved under the influence of a lateral force.

To further improve wheel toe and camber behavior of the vehicle under the influence of longitudinal and lateral forces acting on the rear wheels, the upper front link of the front pair of links and the upper rear link of the rear pair of links can be arranged in v-shape, when viewed from the top, so as to form an opening angle in outward transverse direction of the vehicle. The same applies to the lower front link as well as the lower rear link (i.e., the track rod), which can be arranged in outward transverse direction of the vehicle in v-shape, when viewed from the top, so as to form a further opening angle.

Due to the above described angled arrangement of the links, the two upper links form an upper triangle and the two lower links form a lower triangle. When viewed from the top the upper triangle and the lower triangle can overlap so as to form a joint cutting area. With regard to an advantageous wheel toe and camber behavior, it has proven useful when the spring link is at least partly, in particular essentially entirely arranged within the joint cutting area of the two triangles.

To achieve an advantageous toe-in change during application of a lateral force or a longitudinal force acting on the rear wheel, it is also advantageous when the rotation axis of the rear wheel is arranged between the front pair of links and the rear pair of links, when viewed in longitudinal direction of the vehicle.

In an embodiment, the suspension spring and the vibration damper can be jointly integrated within a suspension strut, which itself is situated between the vehicle body and the lower spring link. On the other hand, the suspension spring and the vibration damper may be supported separately from one another on the lower spring link. The connecting point of the suspension strut or of the separately arranged suspension spring and vibration damper is therefore arranged below the rotation axis of the wheel.

Due to the support on the lower spring link, the suspension spring and the vibration damper are arranged in a low installation position. Thereby, advantages with regard to installation space are achieved in the rear part of the vehicle.

The lower spring link and the lower front link can converge in a lower intersecting point when virtually extended. The upper front link and the upper rear link can also converge in an upper point of intersection virtually extended. The two points of intersection define a steering axle about which the rear wheel rotates during a toe-in change. With respect to a wheel contact point (i.e., between the vehicle wheel and a road surface), the steering axle can be arranged offset outwardly in transverse direction of the vehicle by a transverse offset. As a result, the rear wheel assumes toe-in position when exerting a longitudinal force (i.e., during braking or recuperating mode).

In general, during movement of the vehicle the drive force acts on the wheel center of the rear wheel via the articulated shaft. On the other hand during the braking process the braking force does not act on the wheel center but on the wheel contact point of the rear wheel. This results in different leverage effects on the rear axle during braking and driving. In conventional rear axle link geometries these lead to respectively reversed kinematic behavior. In contrast, due to the special link-geometry of the rear axle according to the invention, an essentially same kinematic behavior is achieved during braking and driving.

The wheel suspension can also include a U-shaped stabilizer bar. This stabilizer can include a pivotally supported middle section, which is oriented in transverse direction of the vehicle, and output legs which protrude from the middle section in longitudinal direction of the vehicle. The output legs can be directly, or as an alternative also indirectly, flexibly connected to the link of the suspension wheel via a substantially vertically extending rod. Advantageously, the output legs of the stabilizer bar can be connected to the upper front link by the vertically extending coupling rod.

In the case of the front pair of links, the upper front link can be set back relative to the lower front link by a longitudinal offset in longitudinal direction of the vehicle. On the other hand in the case of the rear pair or links, the rear upper link and the rear lower link, i.e., the track rod, may not be arranged one after another, but may be arranged so as to cross over when viewed from the top.

BRIEF DESCRIPTION OF THE DRAWING

The advantageous embodiments of the invention described above and/or in the subclaims can—except in cases of clear dependencies or incompatible alternatives—be used individually or in combination with each other.

The invention and its advantageous embodiments and refinements as well as their advantages are described in the following by way of drawings.

Figure 1:
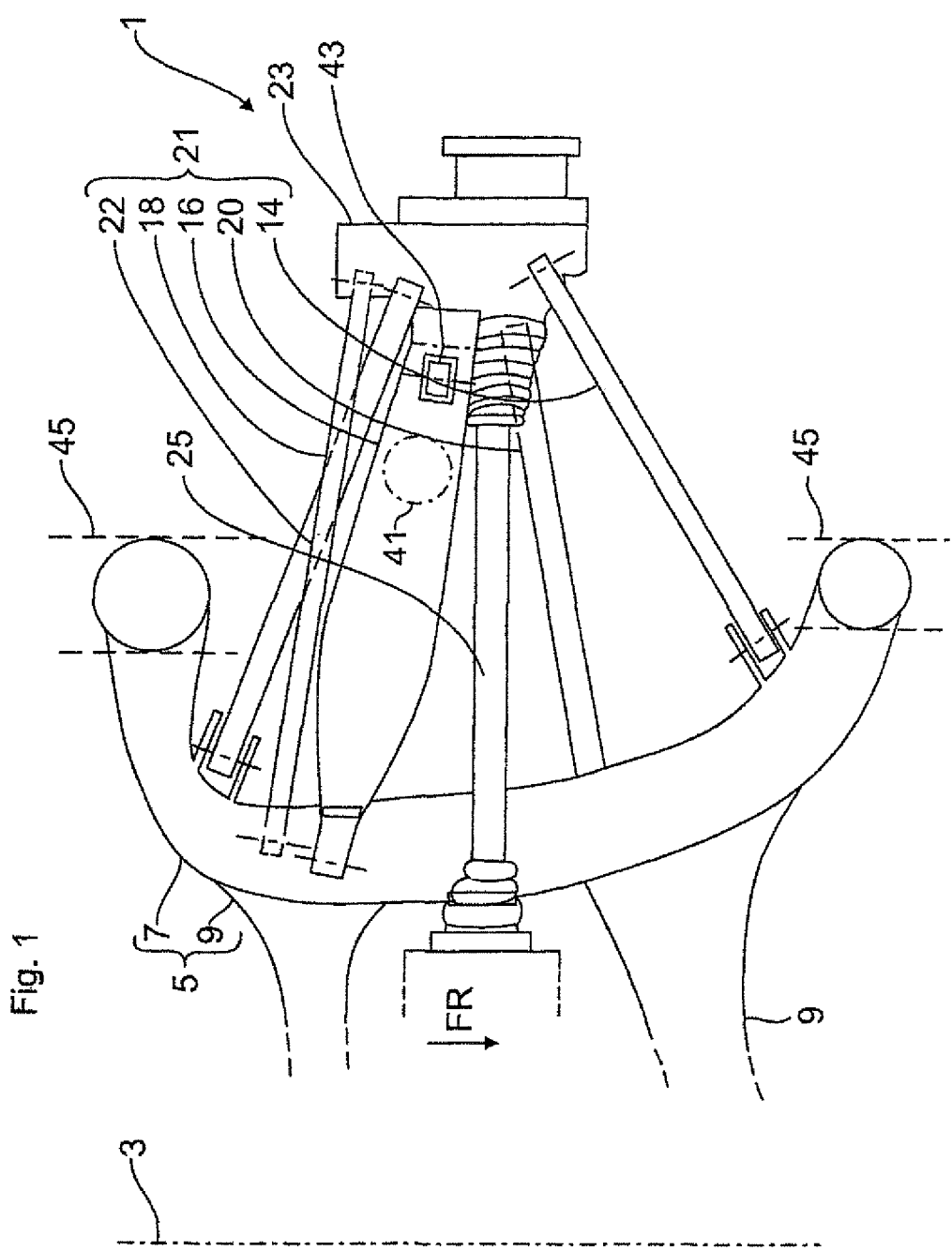
Figure 2:
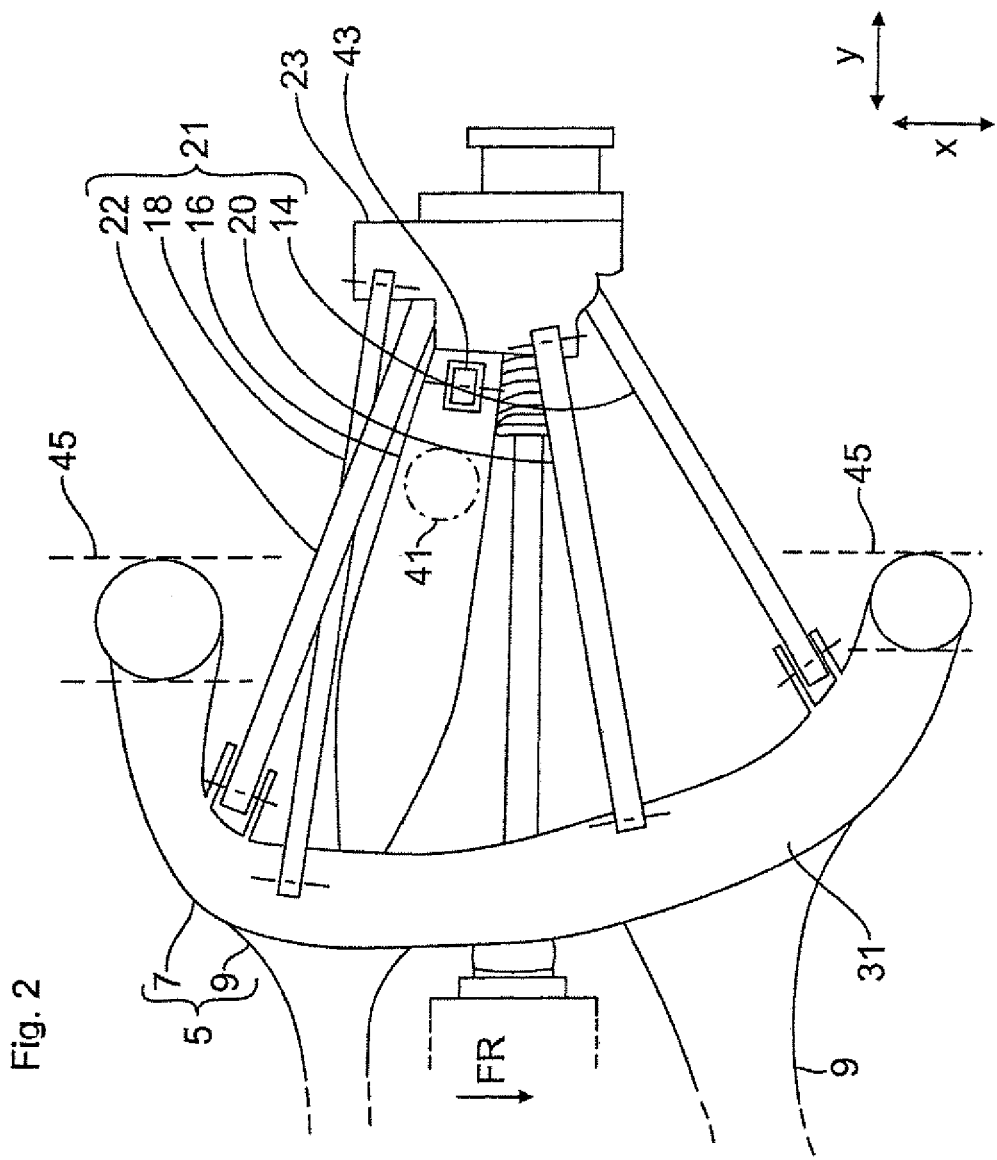
Figure 3:
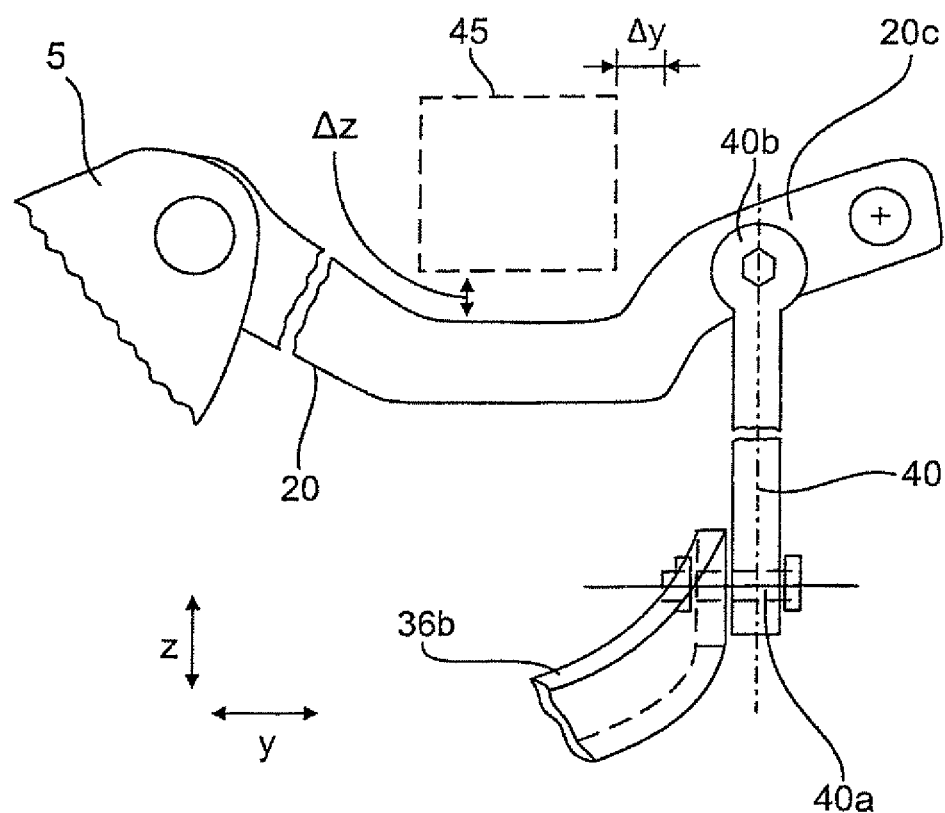
Figure 4:
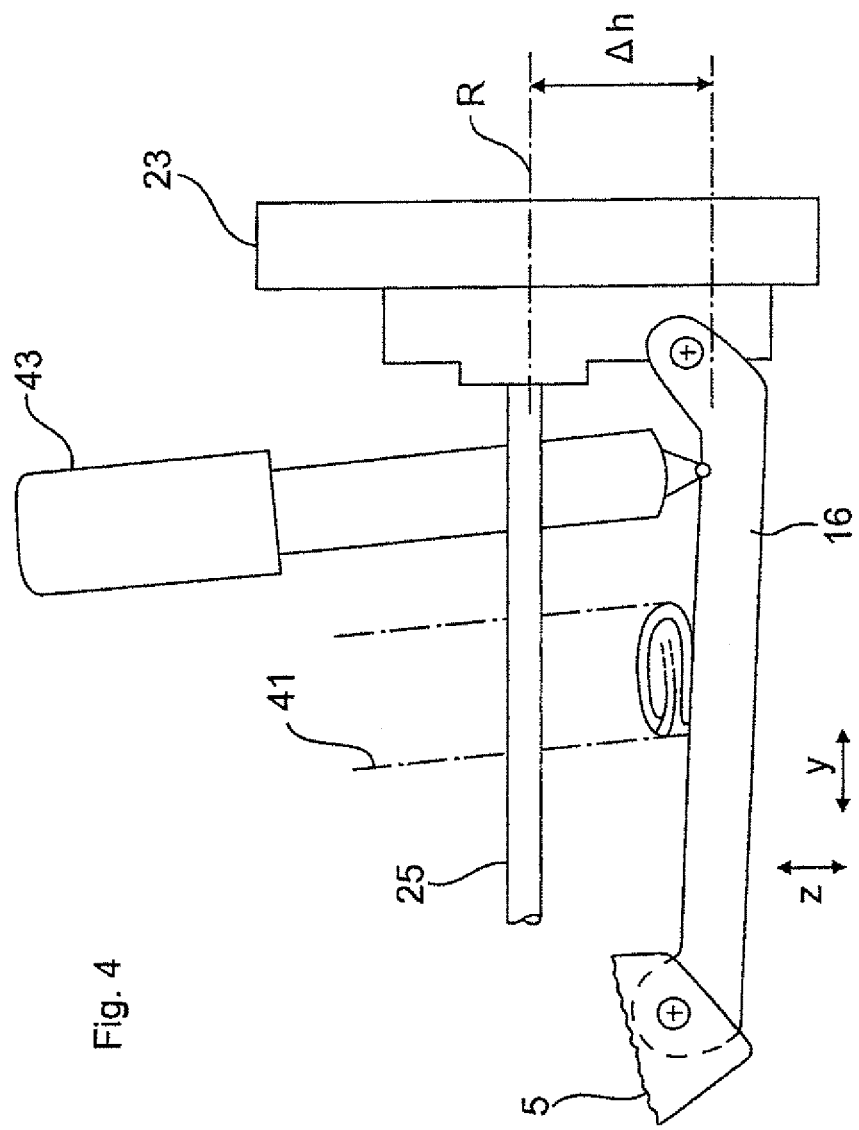
Figure 5:
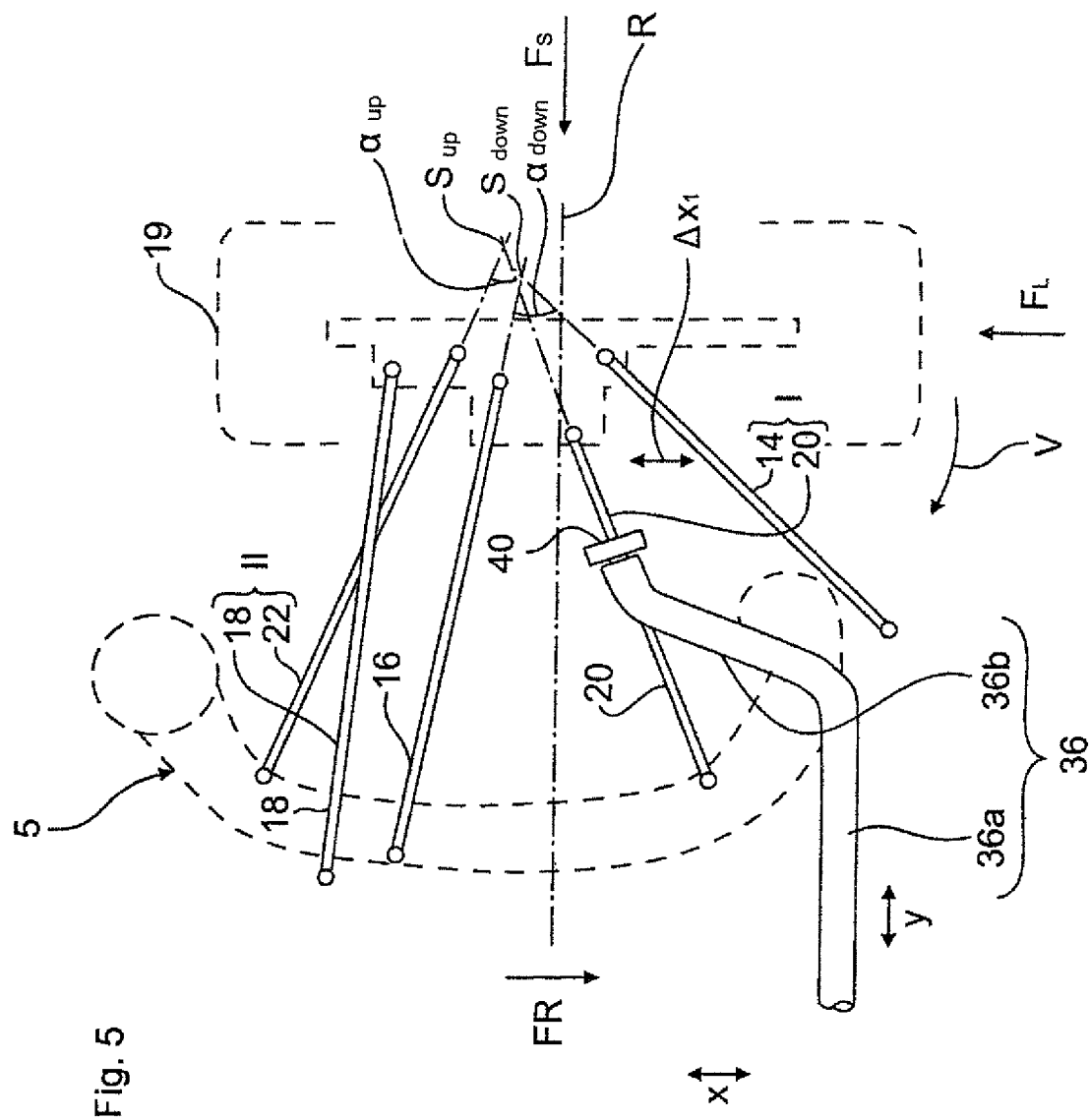

It is shown in:

FIG. 1 in a partial view from below the five-link assembly of the wheel suspension;

FIG. 2 in a partial view from above the five-link assembly of the wheel suspension;

FIG. 3 in a partial view from the front the five-link assembly of the wheel suspension;

FIG. 4 in a further partial view from the front the lower spring link with suspension spring and vibration damper situated thereon; and FIG. 5 the individual links of the five-link assembly in a broadly simplified substitute model.

DETAILED DESCRIPTION OF PREFERRED EMBODIMENTS

FIG. 1 shows a bottom partial view of a rear axle 1 for a motor vehicle, which is only described to the extent necessary to understand the invention. The rear axle 1 is configured mirror-symmetrical with regard to a center longitudinal plane 3 of the vehicle. The rear axle 1 includes an auxiliary frame 5, which is constructed from longitudinal members 7 as well as front and rear cross members 9. The auxiliary frame 5 is connected in a manner known per se on a vehicle shell. On the longitudinal member 7 of the auxiliary frame 5 lower links 14, 16, 18 and upper links 20, 22 are hinged in spatially offset arrangement via a not further shown link bearing. The links 14 to 22 extend outwardly in transverse direction y of the vehicle up to the wheel carrier 23 that carries a rear wheel 19 of the motor vehicle, which is only indicated in FIG. 5. In the present embodiment, the rear wheel 19 is driven by an articulated shaft 25, which leads into a not-shown rear axle differential attached to the auxiliary frame 5.

According to FIG. 5, the five-link assembly 21 of the rear axle 1 is divided into a front pair of links I and a rear pair of links II when viewed in driving direction FR. The front pair of links I includes a lower front link 14, regarding its arrangement relative to axis of rotation R of the wheel, and an upper front link 20. The rear pair of links II includes a lower rear link 18, i.e., the track rod, and an upper rear link 22.

A lower spring link 16 is arranged between both pairs of links I, II when viewed in driving direction FR. According to FIG. 4, a vibration damper 43 and a suspension spring 41 are supported on the lower spring link 16, and form a spring arrangement provided between the vehicle body and the wheel suspension. According to FIG. 4, the connecting points of the vibration dampers 43 and the suspension spring 41 to the spring link 16 are vertically offset downwards from rotation axis R of the rear wheel by a height offset $\Delta h$. Due to the height offset $\Delta h$ of the suspension spring 41 and the vibration damper 43, additional installation space is gained at the rear region of the vehicle.

As further shown in the Figures, the upper front link 20 and the upper rear link 22 are arranged in v-shape relative to one another when viewed from the top, with the V having opening outwardly in transverse direction y of the vehicle with an opening angle $\alpha_{up}$ (FIG. 5). The same applies to the lower front link 14 and the spring link 16, which are arranged v-shaped relative to one another when viewed from the top, with the V opening outwardly in transverse direction y of the vehicle with another opening angle $\alpha_{down}$ (FIG. 5). When viewed in longitudinal direction of the vehicle x, the axis of rotation R of the wheel is furthermore arranged between the front pair of links I and the rear pair of links II.

According to FIG. 5, the two upper links 20, 22 which are arranged v-shaped relative to each other, form an upper triangle, while the two lower links 14, 16 form a lower triangle. The upper triangle and the lower triangle overlap so as to form a cutting area when viewed from the top. The spring link 16 is substantially arranged entirely within the common cutting area.

According to FIG. 5, a virtual extension of the lower spring link 16 and the lower front link 14 converge in a lower intersection $S_{down}$, while a virtual extension of the upper front link 20 and the upper rear link 22 converge in an upper intersection $S_{up}$ and form the opening angle $\alpha_{up}$. Both intersections $S_{up}$ and $S_{down}$ define a steering axle about which the rear wheel 19 essentially pivots during exertion of longitudinal- and lateral forces. In relation to a not shown wheel contact point (between rear wheel and road surface), the steering axle is offset outwardly in transverse direction y of the vehicle by a transverse offset. This results in an advantageous toe-in change V of the rear wheel 19, indicated in FIG. 5 by an arrow, when exerting a longitudinal force $F_L$ (FIG. 5) on the rear wheel 19 (i.e., during the breaking process or recuperation mode).

The front pair of links I, regarding its arrangement relative to the spring link 16, is softer in transverse direction y of the vehicle than the rear pair of links II. The front pair of links I, which is transversely softer than the rear pair of links II, favors a toe-in change V at the rear wheel 19 when exerting a lateral force $F_S$ as indicated in FIG. 5.

In addition, in the front pair of links I, the upper link 20 is set back in longitudinal direction x of the vehicle relative to the lower front link 14 by a longitudinal offset $\Delta x_1$ (FIG. 5). On the other hand, in the rear pair of links II, the upper rear link 22 and the lower rear link 18 are arranged so as to intersect each other when viewed from the top.

As shown in FIG. 5, a U-shaped stabilizer bar 36 is arranged in driving direction FR in front of the axis of rotation R of the wheel and approximately on the same level as the lower link, with a middle section 36a of the stabilizer bar, which extends in transverse direction y of the vehicle, is pivotally arranged on the auxiliary frame 5 via stabilizer bearings.

The, legs 36b of the stabilizer 36 which protrude in opposite direction of travel FR backwards and obliquely outwardly, are pivotally connected at their free ends to the upper front link 20 of the wheel suspension via a respective upwardly projecting rod 40 (FIGS. 3 and 5). The pivot joint 40a, 40b (FIG. 3) of the rod 40 and the legs 36b of the stabilizer 36 and the link 20 are made of rubber-metal-sleeve-bearings.

FIG. 3 shows the wheel suspension in a deflected position of the motor vehicle. Consequently, the hinge joint 40b between the rod 40 and the upper front link 20 is arranged outside of the vehicle's longitudinal members 45 in transverse direction y of the vehicle by a transverse clearance $\Delta y$. Furthermore, the link 20 extending below the vehicle's longitudinal member 45 is curved downwards approximately v-shaped and spaced apart from the vehicle's longitudinal member 45a by a vertical clearance Δz.

The invention claimed is:

1. A wheel suspension for a rear wheel of a two-track motor vehicle, comprising:
    a five-link assembly comprising five individual links pivotally coupled to the vehicle body and to a wheel carrier of the rear wheel via respective bearings on the vehicle body and the wheel-carrier, wherein two of the five individual links form a front pair of links with respect to a direction of travel of the motor vehicle, and another two of the five individual links form a rear pair of links with respect to the direction of travel, said front pair of links, with respect to a rotational axis of the wheel, having a lower front link and an upper front link, said rear pair of links, with respect to the rotational axis of the wheel, having a lower rear link and an upper rear link, wherein a further one of the five individual links is configured as a lower spring link and is arranged in the direction of travel between the front and rear pairs of links;
    a spring arrangement supported on the lower spring link, said spring arrangement comprising a vibration damper and a suspension spring, wherein the front pair of links is configured softer in transverse direction of the motor vehicle than the rear pair of links so that a toe-in change results at the rear wheel in response to a lateral force and a longitudinal force acting on the wheel suspension; and
    a stabilizer, said stabilizer having a pivotally supported middle section oriented in transverse direction of the vehicle and at least one output leg extending from the middle section in longitudinal direction of the vehicle, said output leg being directly or indirectly pivotally connected to one of the five individual links via a substantially vertically extending rod.

2. The wheel suspension of claim 1, wherein lower rear link of the rear pair of links is constructed as a track rod.

3. The wheel suspension of claim 1, wherein the upper front link of the front pair of links and the upper rear link of the rear pair of links are arranged relative to each other in the shape of a V as viewed from atop the motor vehicle, with the V opening outwardly in transverse direction of the vehicle with a defined opening angle.

4. The wheel suspension of claim 1, wherein the lower front link and the spring link are arranged relative to each other in the shape of a V as viewed from atop the motor vehicle, with the V opening outwardly in transverse direction of the vehicle with a defined opening angle.

5. The wheel suspension of claim 1, wherein the rotation axis of the wheel is arranged in longitudinal direction of the vehicle between the front pair of links and the rear pair of links.

6. The wheel suspension of claim 1, wherein the suspension spring and the vibration damper are jointly integrated within a suspension strut which is supported on the spring link or are supported separately from one another on the spring link.

7. The wheel suspension of claim 1, wherein the front upper link and the rear upper link form an upper triangle and the front lower link and the rear lower link form a lower triangle, wherein the upper and lower triangle, as viewed from atop the motor vehicle, intersect so as to form a cutting area, and wherein the spring link is at least partly arranged within the cutting area.

8. The wheel suspension of claim 1, wherein the spring link is at arranged entirely within the cutting area.

9. The wheel suspension of claim 1, wherein the upper front link of the front pair of links is set back relative to the lower front link by a longitudinal offset in longitudinal direction of the motor vehicle.

10. The wheel suspension of claim 1, wherein the stabilizer engages on the upper front link.

11. The wheel suspension of claim 1, wherein the rear upper link and the rear lower link of the rear pair of links intersect one another as viewed from atop the motor vehicle.

12. The wheel suspension of claim 1, wherein rear lower link, which forms the track rod, is arranged so that an attachment point, with which the rear lower link is coupled to the wheel carrier is located behind the rear upper link as viewed in the direction of travel.

13. The wheel suspension of claim 1, wherein a virtual extension of the lower spring link and the lower front link converge in a first intersection point, and wherein a virtual extension of the upper links converge in a second intersection point.

14. The wheel suspension of claim 13, wherein an attachment point with which the rear lower link is coupled to the wheel carrier is located behind the first and second points of intersection as viewed in the direction of travel.

* * * * *